US012256315B2

(12) United States Patent
Singh et al.

(10) Patent No.: US 12,256,315 B2
(45) Date of Patent: *Mar. 18, 2025

(54) WIRELESS GATEWAY SUPPORTING PUBLIC AND PRIVATE NETWORKS

(71) Applicant: Comcast Cable Communications, LLC, Philadelphia, PA (US)

(72) Inventors: Sukhjinder Singh, Upper Darby, PA (US); John Carvalho, Malvern, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 52 days.

This patent is subject to a terminal disclaimer.

(21) Appl. No.: 18/353,549

(22) Filed: Jul. 17, 2023

(65) Prior Publication Data

US 2023/0362789 A1 Nov. 9, 2023

Related U.S. Application Data

(63) Continuation of application No. 17/526,803, filed on Nov. 15, 2021, now Pat. No. 11,751,122, which is a
(Continued)

(51) Int. Cl.
*H04W 48/02* (2009.01)
*H04L 9/40* (2022.01)
(Continued)

(52) U.S. Cl.
CPC .......... *H04W 48/02* (2013.01); *H04L 47/10* (2013.01); *H04L 63/10* (2013.01);
(Continued)

(58) Field of Classification Search
CPC ...... H04L 47/10; H04L 63/10; H04W 12/084; H04W 12/086; H04W 12/088; H04W 48/02; H04W 84/12
See application file for complete search history.

(56) References Cited

U.S. PATENT DOCUMENTS 6,332,077 B1 12/2001 Wu et al.
7,222,175 B2 5/2007 Knauerhase et al.
(Continued)

FOREIGN PATENT DOCUMENTS

EP 1416686 A1 * 5/2004 ............ H04W 28/08
EP 1515487 A1 3/2005
(Continued)

OTHER PUBLICATIONS

European Search Report—EP 13169196.6—Mailing Date: Oct. 7, 2013.
(Continued)

*Primary Examiner* — Michael Simitoski
(74) *Attorney, Agent, or Firm* — Banner & Witcoff, Ltd.

(57) ABSTRACT

An interface device may provide a first wireless network and a second wireless network in a user's premise. The interface device may encourage some user devices to connect to the second wireless network without controlling the user devices. For example, the interface device may receive a request from a device to access its first wireless network. The interface device may then determine whether the device is a premise device by, for example, searching a database of device registration information. The interface device may determine that the device is a premise device and deny the request to access the first wireless network. The device may then be available to access the second wireless network.

42 Claims, 7 Drawing Sheets

Related U.S. Application Data continuation of application No. 16/146,683, filed on Sep. 28, 2018, now Pat. No. 11,206,600, which is a continuation of application No. 13/480,988, filed on May 25, 2012, now Pat. No. 10,129,751.

(51) Int. Cl.
*H04L 47/10* (2022.01)
*H04W 12/084* (2021.01)
*H04W 12/086* (2021.01)
*H04W 12/088* (2021.01)
*H04W 84/12* (2009.01)

(52) U.S. Cl.
CPC ....... *H04W 12/084* (2021.01); *H04W 12/086* (2021.01); *H04W 12/088* (2021.01); *H04W 84/12* (2013.01)

(56) References Cited

U.S. PATENT DOCUMENTS

| | | | |
|---|---|---|---|
| 7,480,264 B1 | 1/2009 | Duo et al. | |
| 7,535,880 B1 | 5/2009 | Hinman et al. | |
| 7,565,529 B2 | 7/2009 | Beck et al. | |
| 7,924,793 B2 | 4/2011 | Savoor et al. | |
| 8,151,336 B2 | 4/2012 | Savoor | |
| 8,172,752 B2* | 5/2012 | Russ | H04M 1/725 455/410 |
| 8,549,585 B2 | 10/2013 | Hanakshirur et al. | |
| 8,600,378 B1 | 12/2013 | Oroskar et al. | |
| 8,644,206 B2 | 2/2014 | Krishnaswamy et al. | |
| 8,681,735 B2 | 3/2014 | Mizukoshi et al. | |
| 2001/0044893 A1 | 11/2001 | Skemer | |
| 2003/0021254 A1 | 1/2003 | Fukuda | |
| 2004/0003285 A1 | 1/2004 | Whelan et al. | |
| 2004/0185876 A1 | 9/2004 | Groenendaal et al. | |
| 2004/0209617 A1 | 10/2004 | Hrastar | |
| 2005/0060576 A1 | 3/2005 | Kime et al. | |
| 2005/0135304 A1 | 6/2005 | Wentink et al. | |
| 2006/0068795 A1 | 3/2006 | Caspi et al. | |
| 2006/0072527 A1 | 4/2006 | Beck et al. | |
| 2006/0153122 A1 | 7/2006 | Hinman et al. | |
| 2006/0165103 A1 | 7/2006 | Trudeau et al. | |
| 2006/0221901 A1 | 10/2006 | Yaqub et al. | |
| 2006/0236376 A1 | 10/2006 | Liu et al. | |
| 2007/0060105 A1 | 3/2007 | Batta | |
| 2007/0072638 A1 | 3/2007 | Yang et al. | |
| 2007/0099632 A1* | 5/2007 | Choksi | H04W 48/16 455/422.1 |
| 2007/0281711 A1 | 12/2007 | Matta | |
| 2008/0016556 A1 | 1/2008 | Selignan | |
| 2008/0096575 A1 | 4/2008 | Aragon et al. | |
| 2008/0117836 A1 | 5/2008 | Savoor et al. | |
| 2008/0123852 A1 | 5/2008 | Jiang | |
| 2008/0133749 A1 | 6/2008 | Sample | |
| 2008/0263660 A1 | 10/2008 | Duffau et al. | |
| 2009/0046644 A1 | 2/2009 | Krishnaswamy et al. | |
| 2009/0067436 A1 | 3/2009 | Gast et al. | |
| 2009/0073943 A1 | 3/2009 | Krishnaswamy et al. | |
| 2009/0233646 A1 | 9/2009 | Cyzs et al. | |
| 2009/0318160 A1 | 12/2009 | Li | |
| 2010/0103831 A1 | 4/2010 | Caldwell et al. | |
| 2010/0110921 A1 | 5/2010 | Famolari et al. | |
| 2010/0146614 A1 | 6/2010 | Savoor | |
| 2010/0175116 A1 | 7/2010 | Gum | |
| 2010/0216465 A1 | 8/2010 | Mubarek et al. | |
| 2011/0044304 A1 | 2/2011 | Connelly et al. | |
| 2011/0264912 A1 | 10/2011 | Kotay et al. | |
| 2011/0268022 A1 | 11/2011 | Xu | |
| 2012/0079567 A1 | 3/2012 | Van De Groenendaal | |
| 2012/0127942 A1 | 5/2012 | Cook et al. | |
| 2012/0149367 A1 | 6/2012 | Miranda et al. | |
| 2012/0195295 A1 | 8/2012 | Elmaleh | |
| 2012/0243474 A1 | 9/2012 | Iyer et al. | |
| 2012/0317619 A1 | 12/2012 | Dattagupta et al. | |
| 2012/0322481 A1 | 12/2012 | Laroche et al. | |
| 2013/0103833 A1 | 4/2013 | Ringland et al. | |
| 2013/0208693 A1 | 8/2013 | De La Forest Divonne et al. | |
| 2014/0177589 A1 | 6/2014 | Sanderson et al. | |
| 2015/0215766 A1 | 7/2015 | Russell et al. | |
| 2016/0249267 A1 | 8/2016 | Ho et al. | |
| 2016/0330662 A1 | 11/2016 | Mestanov et al. | |

FOREIGN PATENT DOCUMENTS

| | | |
|---|---|---|
| EP | 2469936 A1 | 6/2012 |
| EP | 2712229 A1 | 3/2014 |
| WO | 2005/109929 A2 | 11/2005 |
| WO | 2008151830 A1 | 12/2008 |
| WO | 2012052660 A2 | 4/2012 |
| WO | 2012052660 A3 | 7/2012 |
| WO | 2012/166671 A1 | 12/2012 |

OTHER PUBLICATIONS

European Office Action—EP 13169196.6—Mailing Date: Jan. 27, 2017.
Cisco. "Keeping Internal Users off Guest Wireless", Mar. 2010, <"https:supportforums.cisco.com/discussion/10862396/keeping-internal-users-guest-wireless">.
Cisco. "Prevent Corporate devices from connecting to Public Wifi", Apr. 2011, <https://supportforums.cisco.com/discussion/11175321/prevent-corporate-devices-connecting>.
Dec. 13, 2017—European Office Action—EP 13169196.6.
Feb. 26, 2019—CA Office Action—CA 2,816,131.
Feb. 19, 2020—Canadian Office Action—CA 2,816,131.
Dec. 11, 2020—Canadian Office Action—CA 2,816,131.

* cited by examiner

400

| Interface ID | Network SSID | Device ID | Time of Last Connection | Time Period of Inactivity |
|---|---|---|---|---|
| 00AA11BB22CC | 102a_home | 01AB23CD45EF | M1/D1/YYY1 H1:M1:S1 | 0 days 00:00:00 |
| 00AA11BB22CC | 102a_john_private | 12AB34CD56EF | M2/D2/YYY2 H2:M2:S2 | 7 days 01:23:45 |
| ~~00AA11BB22CC~~ | ~~102b_home~~ | ~~23AB45CD67EF~~ | ~~M3/D3/YYY3 H3:M3:S3~~ | ~~30 days 00:00:00~~ |
| 00BB11CC22DD | 102b_private | 01BC23DE45FG | M4/D4/YYY4 H4:M4:S4 | 0 days 00:00:00 |
| 00BB11CC22DD | 102b_private | 12BC34DE56FG | M5/D5/YYY5 H5:M5:S5 | 1 day 02:34:56 |
| ~~00BB11CC22DD~~ | ~~102b_private~~ | ~~23BC45DE67FG~~ | ~~M6/D6/YYY6 H6:M6:S6~~ | ~~60 days 00:00:00~~ |
| 00CC11DD22EE | Restaurant_secure | 01CD23EF45GH | M7/D7/YYY7 H7:M7:S7 | 0 days 23:12:34 |
| ~~00CC11DD22EE~~ | ~~Restaurant_secure~~ | ~~12CD34EF56GH~~ | ~~M8/D8/YYY8 H8:M8:S8~~ | ~~90 days 00:00:00~~ |
| 00DD11EE22FF | University | 01DE23FG45HI | M9/D9/YYY9 H9:M9:59 | 32 days 12:23:34 |

Row labels: 411, 412, 413, 414, 415, 416, 417, 418, 419
Column labels: 402, 404, 406, 408, 410

FIG. 4

WIRELESS GATEWAY SUPPORTING PUBLIC AND PRIVATE NETWORKS

CROSS-REFERENCE TO RELATED APPLICATIONS

This application is a continuation of and claims priority to U.S. patent application Ser. No. 17/526,803, filed Nov. 15, 2021, which is a continuation of U.S. patent application Ser. No. 16/146,683, filed Sep. 28, 2018 (now U.S. Pat. No. 11,206,600), which is a continuation of U.S. patent application Ser. No. 13/480,988, filed May 25, 2012 (now U.S. Pat. No. 10,129,751), each of which is hereby incorporated by reference in its entirety.

BACKGROUND

The promulgation of wireless technology has facilitated access to data at virtually any location. User devices, such as laptops, tablets, mobile phones, and other portable computing devices, are provided with the capability of accessing a variety of wireless networks, such as Wi-Fi hotspots and wireless local area networks (WLANs). Improvements are needed for user devices to communicate with and share resources among networks.

BRIEF SUMMARY

In accordance with various aspects of the disclosure, systems and methods are provided for an interface device that provides access to two or more wireless networks (e.g., public or private wireless networks) and encourages user devices, such as client devices authorized to access the user's private wireless network, to connect to one of the wireless networks (e.g., the private wireless network) instead of the other wireless network (e.g., the public wireless network) based on factors such as prior connection activity of those client devices. For example, the interface device may store information, such as a listing related to devices that have successfully accessed its second wireless network in a prior time period, and deny requests from those devices to access its first wireless network; thereby encouraging those devices to connect to the second wireless network instead. The disclosed systems and methods may be implemented without directly controlling the client devices, knowing the settings of their network connection managers, or involving the local office of a service provider. Denying the connection to the first wireless network may be sufficient to cause the device to search for, and connect to, the second wireless network instead.

In one aspect, the interface device may provide access to a public wireless network and a private wireless network in a user's home (or another premise). Although the wireless networks may share the same resources, such as hardware, the networks may receive different bandwidth allocations. For example, allocations may differ for communications outside the home, and it may be preferable to encourage a user to consume the private network's allotted bandwidth instead of the public network's allocation. This may be beneficial, for example, if the public network is used to provide shared services in a wide area, such as neighborhood. Another aspect of the disclosure addresses a scenario where the bandwidth available for the shared services could be unnecessarily diminished if users in an area used the public network for communications that they could just as easily conduct over their private networks.

In another aspect, the interface device may enable user devices to connect to the second wireless network instead of the first wireless network by storing information for devices (e.g., client devices) having access to, or having previously accessed, the second wireless network. For example, the interface device may store registration information for devices that are authorized to access the second wireless network or that have previously accessed the second wireless network. The registration information may include, for example, address information (e.g., a list of unique identifiers (UIDs) such as media access control (MAC) addresses, international mobile subscriber identity (IMSI) numbers, internet protocol (IP) addresses) and connection information (e.g., time of connection, duration, speed, etc.). Before allowing any client device to connect to the first wireless network, the interface device may analyze the stored information to determine whether the client device has access to the second wireless network. The interface device may deny a request to access the first wireless network if it is determined that the client device requesting access to the first wireless network has access to the second wireless network.

In some embodiments, the interface device may remove registration information from the database after a predetermined time period of inactivity. For example, the interface device may purge the stored information to remove devices that have not connected to the second wireless network within, for example, the last 30 days.

In some embodiments, after being denied access to the second wireless network, the client device may detect that the first wireless network is also in the vicinity, and may choose to connect to it instead.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features described herein are illustrated by way of example, and not by way of limitation, in the figures of the accompanying drawings in which like reference numerals refer to similar elements.

FIG. 4 illustrates example information for devices having access to various wireless networks.

DETAILED DESCRIPTION

Figure 1:
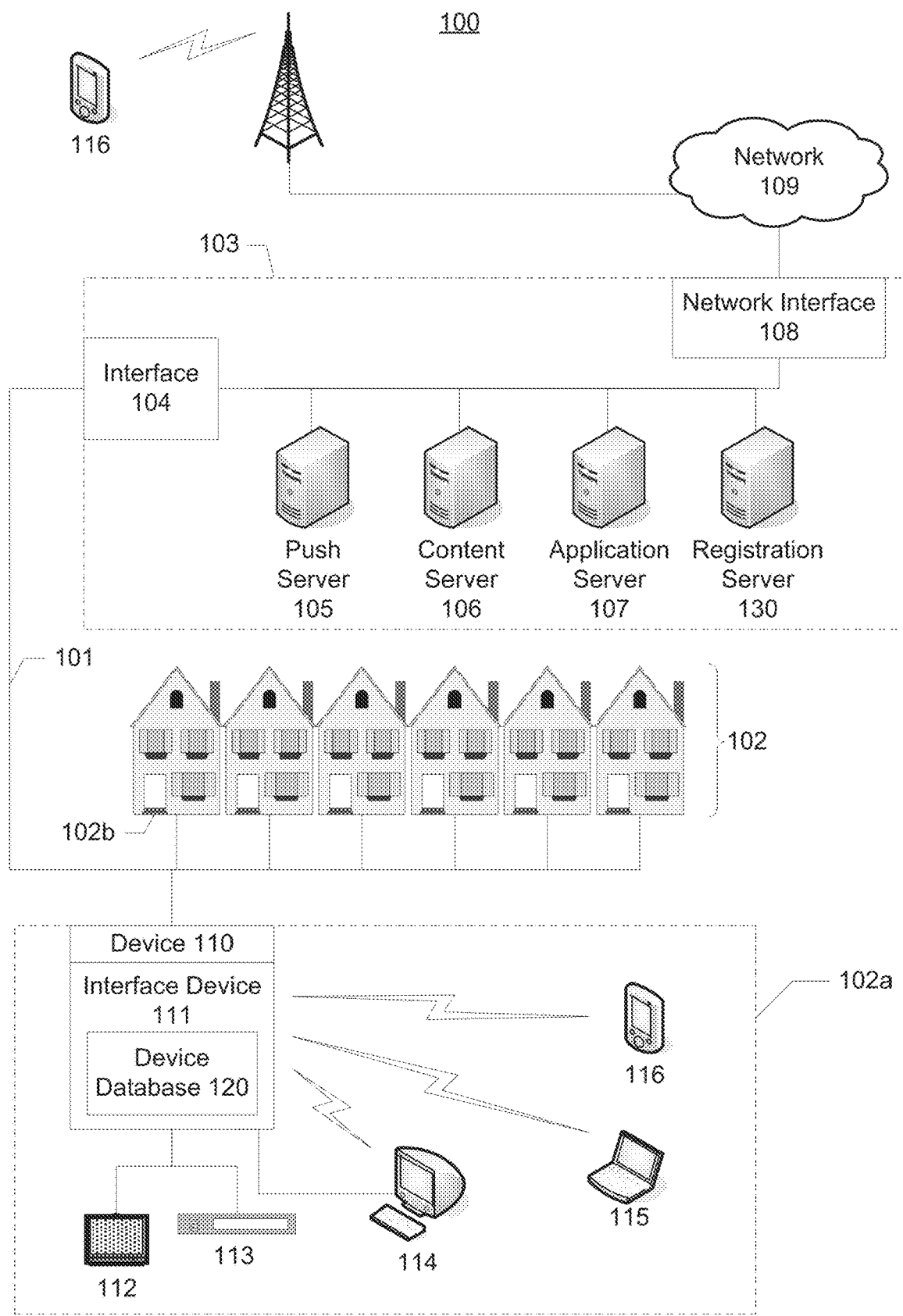
FIG. 1 illustrates an example network environment.

FIG. 1 illustrates an example information distribution network 100 on which many of the various features described herein may be implemented. The illustrated computing system environment is only one example of a suitable network environment and is not intended to suggest any limitation as to the scope of use or functionality of the disclosure. The illustrated network environment should not be interpreted as having any dependency or requirement relating to any component or combination of components in an information distribution environment.

Network 100 may be a wireless network, an optical fiber network, a coaxial cable network, a hybrid fiber/coax (HFC) distribution network, or any other type of information distribution network or combination of networks. For example, network 100 may be a coaxial system comprising a cable modem termination system (CMTS) communicating with numerous interface devices (e.g., interface device 111 in example premise 102a). In another example, the network 100 may be a fiber optic service system comprising optical fibers extending from an optical line terminal (OLT) to numerous optical network terminals (ONTs) communicatively coupled with various interface devices. In another example, the network 100 may be a digital subscriber line (DSL) system that includes local office 103 communicating with numerous interface devices. In another example, network 100 may be a hybrid fiber coax (HFC) where Internet traffic is routed over both optical and coaxial communication paths to an interface device in or near a user's home. Various aspects of the disclosure may operate on one or more of the aforementioned networks or any other suitable network architectures, now known or future developed.

Network 100 may use a series of interconnected communication links 101 (e.g., coaxial cables, optical fibers, wireless links, etc.) to connect premises such as premises 102 or other user environments to local office 103. Communication links 101 may include any suitable wired communication paths, wireless communications paths, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other suitable components for communicating data.

Local office 103 may transmit downstream information signals onto communication links 101, and each of premises 102 may receive and process those signals. In certain implementations, communication links 101 originate from local office 103 as a single communications path, and may be split into any suitable number of communication paths to distribute data to premises 102 and various other destinations. Although the term "home" is used by way of example, premises 102 may include any type of user environment or premises, such as single family homes, apartment complexes, businesses, schools, hospitals, parks, and other suitable environments or combinations of environments.

Local office 103 may include interface 104, which may be a computing device configured to manage communications between devices on the network of communication links 101 and backend devices, such as server 105, server 106, server 107, and server 130. For example, interface 104 may be a cable modem termination system (CMTS). The termination system (TS) may be as specified in a standard, such as, in an example of an HFC-type network, the Data Over Cable Service Interface Specification (DOCSIS) standard, published by Cable Television Laboratories, Inc. The TS may be configured to transmit data over one or more downstream channels or frequencies to be received by various devices, such as modems in premises 102, and to receive upstream communications from those modems on one or more upstream frequencies.

Local office 103 may include one or more network interfaces 108 for communicating with one or more external networks 109. One or more external networks 109 may include, for example, one or more Internet Protocol networks, telephone networks, cellular telephone networks, fiber optic networks, local wireless networks (e.g., Wi-Fi, WiMAX), satellite networks, and any other network or combination of networks. One or more network interfaces 108 may include the corresponding circuitry needed to communicate with one or more external networks 109, and with devices accessible through one or more external networks 109. For example, one or more external networks 109 may communicate with one or more content sources, such as multicast or unicast video sources, which may supply video streams for ultimate consumption by various client devices in premises 102. Client devices may include, but are not limited to, personal computers (PCs), server computers, hand-held or laptop computing devices, tablet computing devices, netbook computers, multiprocessor systems, microprocessor-based systems, set-top boxes (STBs), programmable consumer electronics, mobile or cellular phones, smart phones, media player devices, entertainment devices, household appliances (e.g., networked washing machines, refrigerators, light switches, etc.), robotic devices, security monitoring devices, medical monitoring devices, electronic apparel, game consoles, and any other suitable device or combination of devices.

Local office 103 may include a variety of servers that may be configured to perform various functions. For example, local office 103 may include a push notification server 105 that can generate push notifications to deliver data, commands, or both to devices in premises 102 that are configured to detect such notifications. Local office 103 may also include a content server 106 configured to provide content to devices in premises 102. This content may be, for example, video on demand movies, television programs, songs, text listings, graphics, advertisements, and other suitable content. Content server 106 may include software to validate device identities and entitlements, locate and retrieve requested content, encrypt content, and initiate delivery of content to the requesting device. Local office 103 may include one or more application servers 107. Application server 107 may be, for example, a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, application server 107 may be used to implement a cache server for the content found on content server 106. Another example application server may be responsible for collecting data such as television program listings information and generating a data download for electronic program guide listings. Another example application server may be responsible for monitoring user viewing habits and collecting that information for use in selecting advertisements. Another example application server may be responsible for formatting and inserting advertisements in a video stream being transmitted to devices in premises 102. Another example application server may be responsible for receiving user remote control commands and processing them to provide an intelligent remote control experience.

Local office 103 may include registration server 130, which may be a storage computing device or server storing a registration database (and which may be another example of an application server 107). The registration database may store registration information for a variety of client devices. Registration server 130 may include, for example, address information for client devices with access to various public and private wireless networks communicatively coupled to local office 103, address information for interface devices, connection information, and any other suitable information, such as address information for intermediate devices that respectively handle the client devices' or interface devices' communications. Address information may include, for example, a unique identifier (UID), a hardware address, a media access control (MAC) address, an internet protocol (IP) address, a user name, a device name, or any other suitable information. Connection information may include, for example, time of connection, duration, speed, signal quality, amount of data transmitted to a device, amount of data received from the device, network identifier of the connection (e.g., for multiple public and private wireless networks), and any other suitable information. In certain implementations, registration server 130 may include information determined from historical registration information, such as average (e.g., arithmetic or geometric mean, median, mode) values of previous connection times, durations, signal strengths, and speeds for various client devices. In certain implementations, registration server 130 may include an authentication table containing authentication information for various client devices. For example, local office 103 may automatically authenticate client devices requesting access to a public or private wireless network communicatively coupled to local office 103 using an authentication table stored a storage computing device or server. The use of an authentication table may allow for enhanced user experience and bandwidth efficiencies due to faster authentication times and increased ease of network connection.

In some embodiments, premises 102 may be represented by example premise 102a, which may be a single family home, an apartment, a public library, an outdoor restaurant, an office suite, or any other suitable indoor or outdoor environment. Example premise 102a may include device 110 for communicating with local office 103, one or more external networks 109, or both. Device 110 may include any suitable device for transmitting and receiving data. For example, device 110 may be a coaxial cable modem (for coaxial cable links 101), a broadband modem (for DSL links 101), a fiber interface node (for fiber optic links 101), or any other suitable device or combination of devices. For example, device 110 may be a modem and may include transmitters and receivers for communicating with local office 103, one or more external networks 109, or both over communication links 101. In certain implementations, device 110 may be a part of, or communicatively coupled to, interface device 111.

Interface device 111 may be any suitable computing device for communicating with device 110 to allow one or more other devices in example premise 102a to communicate with local office 103, one or more external networks 109, and other devices communicatively coupled thereto. Interface device 111 may be, for example, a gateway, a wireless router, a set-top box, a computer server, or any other suitable computing device or combination. Interface device 111 may also include local network interfaces to provide communication signals to client devices in example premise 102a, such as television 112, set-top box 113, personal computer 114, laptop computer 115, wireless device 116 (e.g., wireless laptop, netbook, tablet computer, mobile phone, mobile television, portable gaming device, etc.), and any other suitable device. Local network interfaces may include, for example, Multimedia Over Coax Alliance (MoCA) interfaces, Ethernet interfaces, universal serial bus (USB) interfaces, wireless interfaces (e.g., IEEE 802.11, IEEE 802.16), Bluetooth interfaces, and other suitable interfaces. In certain embodiments, one or more of the client devices in example premise 102a may include an application software client for processing video images captured by image capture devices. For example, interface device 111 may provide a security monitoring service for example premise 102a using a private wireless network, public wireless network, wired network, or any suitable combination of networks.

Interface device 111 may include, or be communicatively coupled to, a modem component for encoding and decoding data transmissions. Interface device 111 may include, for example, a modem for providing Internet services (e.g., device 110, broadband modems, cable modems, wireless modems), voice communications equipment (e.g., embedded multimedia terminal adapter, embedded digital voice adapter, Voice-over-IP, terminal adapters), or any other suitable device or combination of devices. For example, interface device 111 may include device 110 for receiving data from and transmitting data to local office 103 over a data network such as a television network.

Interface device 111 may include, or be communicatively coupled to, a wireless communications component for wirelessly receiving data from and wirelessly transmitting data to client devices 112, 113, 114, 115, and 116, as well as to other interface devices and devices communicatively coupled to network 100. The wireless communications component may operate using conventional wireless technologies, such as Wi-Fi and WiMax. For example, the wireless communications component may use different physical layer technologies, broadcast on different channels, or provide different local area networks (LANs), wireless local area networks (WLANs), or virtual local area networks (VLANs).

In some embodiments, interface device 111 may include both a modem component and a wireless communications component. Such a fully-integrated device may allow bi-directional data communication with local office 103 and client devices 112, 113, 114, 115, 116, and any other suitable device or network. In other embodiments, the modem component, the wireless communications component, or both may be located in devices separate or remote from interface device 111. For example, the modem component may be located outside a user's home in an optical network terminal (ONT), while the wireless communications component may be located with a wireless antenna in a different location in the user's home than interface device 111. In other embodiments, both the modem component and wireless communications component may be located outside the user's home, but still provide Internet access to the user's client devices. In certain implementations, a service provider may provide a modem component and various other components, while a user may provide a wireless communications component.

In some embodiments, interface device 111 may serve as a wireless access point for providing various wireless networks to users' devices, such as client devices. For example, interface device 111 may be a wireless router and provide an indirect communications path, such as a backhaul connection, to a public network, such as the Internet, through local office 103. Interface device 111 may route different media formats (e.g., data, voice, video) and may support unicast, broadcast, multicast, or any other suitable traffic. In certain implementations, interface device 111 may include, or be communicatively coupled to, one or more antennas for transmitting and receiving wireless communications. For example, interface device 111 may include an omnidirectional antenna for broadcasting in and receiving data from all horizontal directions within a wireless broadcasting range (e.g., 100 meters) of the antenna. In another example, interface device 111 may include a directional, high gain antenna for preferentially broadcasting in and receiving data from a particular direction within a wireless broadcasting range (e.g., 150 meters in a particular horizontal direction) of the antenna. In certain implementations, the wireless broadcasting range may vary with frequency band. For example, a wireless network broadcast in a 2.4 GHz frequency band may have a greater wireless broadcasting range than a wireless network broadcast in a 5 GHz frequency band.

In some embodiments, interface devices in user premises 102 (e.g., homes, businesses, institutions, etc.) may provide wireless access points with overlapping ranges. For example, example premise 102a and example premise 102b may both include interface devices that provide public and private networks. As a result, a client device located in example premise 102a may be within range of both wireless access points provided by both of the interface devices (e.g., wireless device 116 may be within range of the four wireless networks collectively provided by the interface device located in premise 102a and the interface device located in premise 102b). This embodiment will be discussed further with reference to FIG. 3.

In some embodiments, interface device 111 may provide access to different wired and wireless networks for the client devices in example premise 102a using different types of wireless components. For example, interface device 111 may provide a first wireless network and a second wireless network different from the first wireless network. A first client device (e.g., laptop 115 with wireless 802.11a/b/g/n capabilities) may connect to the first wireless network provided by interface device 111. Meanwhile, a second client device (e.g., wireless device 116) may connect to the second wireless network provided by interface device 111.

In some embodiments, interface device 111 may provide access to two networks, such as a public wireless network and a private wireless network within a similar or the same wireless broadcasting range. For example, a private network may provide services to the user's devices, while a different (e.g., public, second private) network may provide services for guests to the user's home or third-party users (e.g., subscribers) of a service provider. In one example, interface device 111 may comprise a dual (or greater) band wireless router and provide a public wireless network on a 2.4 GHz frequency band and a private wireless network on a 5 GHz frequency band. In another example, interface device 111 may provide a first private wireless network maintained by local office 103 on a first frequency band and a second private wireless network maintained by a user in example premise 102a on a second frequency band different from the first frequency band. In another example, interface device 111 may provide any suitable number and combination of networks such as public and private wireless networks to any suitable category of user using any suitable wireless communications technique. In another example, interface device 111 may provide the public and private wireless networks on the same frequency band or channel. In certain implementations, the public and private wireless networks may have different service level agreements (SLAs), which may result in different byte limits, allocated bandwidths, authentication/encryption processes, or any other suitable processes or parameters. Public and private wireless networks are discussed below in accordance with various embodiments of the disclosure.

A public wireless network may be a wireless network with less restrictive (e.g., as compared to a private wireless network) access to client devices within a wireless broadcasting range of interface device 111 or an antenna communicatively coupled to interface device 111. For example, interface device 111 may grant a request from a client device to connect to its public wireless network with little or no authentication requirements. In another example, interface device 111 may grant a request from a client device to connect to its public wireless network in accordance with authentication requirements established by local office 103 (e.g., corresponding to registration or subscription rules for a service providers' wireless network). In certain implementations, a public wireless network may be a wireless network whose resources are reserved for the use of a service provider or the owner of local office 103. For example, a public wireless network may be implemented as a wireless hotspot through which wireless client devices may connect to the Internet. In some implementations, a group of connected hotspots (e.g., a wireless community network, a lily pad network) may allow client devices to stay continuously or semi-continuously connected to the Internet while moving from one location to another location. Client devices with access to only interface device 111's public wireless network are referred to herein as public client devices.

A private wireless network may be a wireless network with restricted access to pre-authorized client devices, or a wireless network whose resources are reserved for use by a user of a premise (e.g., the owner of a home) in which the wireless network is provided. Authorized client devices may include, for example, client devices belonging to the owner or lessee of interface device 111 and the owner's designated family members, friends, and invited guests. For example, interface device 111 may grant a request from a client device to connect to its private wireless network in accordance with the authentication requirements (e.g., username/password, pre-shared key, device filtering based on unique identifiers) of interface device 111. A private wireless network may be implemented as, for example, a private LAN in a user's home. Client devices with access to interface device 111's private wireless network are referred to herein as devices.

In some embodiments, interface device 111 may include, or be communicatively coupled to, a database of user or client devices' registration information, such as a device database. The device database 120 may be a data structure stored in a memory of the interface device 111. In certain implementations, device database 120 may be stored remotely in registration server 130. Device database 120 may include any suitable hardware (e.g., processor, memory), software, or both for storing, maintaining, and securing registration information for a plurality of devices. Registration information may include, for example, address information for client devices with access to the private wireless network, address information for interface devices, connection information, and any other suitable information, such as address information for intermediate devices that respectively handle the client devices' communications, the interface devices' communications, or both. Address information may include, for example, a unique identifier, a hardware address, a MAC address, an IP address, a user name, a device name, or any other suitable information. Connection information may include, for example, time of connection, duration, speed, signal quality, amount of data transmitted to a device, amount of data received from the device, network identifier of the connection (e.g., for multiple private wireless networks), and any other suitable information. In certain implementations, device database 120 may include information determined from historical registration information, such as average (e.g., arithmetic or geometric mean, median, mode) values of previous connection times, durations, signal strengths, and speeds for various devices. Example information that may be included in device database 120 will be discussed further with reference to FIG. 4.

In certain implementations, interface device 111, device database 120, or both may store an authentication table containing authentication information for devices that interface device 111 may allow access to the private wireless network. For example, interface device 111 may authenticate devices requesting access to the private wireless network (or devices that have been denied access to the public wireless network) using an authentication table stored in device database 120.

In some embodiments, interface device 111, local office 103, or both may dynamically update device database 120, registration server 130, or both to permit or block usage of particular client devices on various networks. For example, client devices may be added to or removed from device database 120 by an administrator of interface device 111, local office 103, or both. In one example, interface device 111 may identify a client device as a device by adding the client device's MAC address to device database 120 once it has connected to interface device 111's private wireless network. In another example, device database 120 may include a user-specified list of MAC addresses for client devices that have been identified as devices by an administrator of interface device 111's private wireless network. In another example, device database 120 may include a list of MAC addresses and corresponding connection times for client devices that have connected to its private wireless network over a predetermined period of time (e.g., in the last 30 days). Interface device 111, local office 103, or both may purge this list at any suitable frequency (e.g., every 30 days), at which time client devices that have not connected to the private wireless network during the predetermined period of time are removed from the list. As a result, these client devices are no longer identified as devices and may be allowed to access to the public wireless network provided by interface device 111.

In certain implementations, the authentication of client devices may be performed by a device remote from interface device 111. For example, a device may receive authorization to access the private wireless network from an authorization server at local office 103 after requesting authentication through interface device 111. In another example, interface device 111 may store an authentication table in its local memory and authorize a device without requiring access to local office 103. In yet another example, interface device 111 may enforce authentication policies that require credentials to be validated based on inactivity or after a predetermined threshold amount of usage or service.

In some embodiments, interface device 111 may receive a request from a client device to connect to its public wireless network. For example, a user may enter example premise 102*a* with wireless device 116, which may automatically request to connect to interface device 111's public wireless network because it was previously connected to a public wireless network in another location, such as a restaurant. When the request is received, interface device 111 may query device database 120 to determine if the requesting client device is a premise client device. For example, interface device 111 may determine that the requesting client device is a premise client device if its address information is stored in device database 120. If the address information of the requesting client device is not found in device database 120, interface device 111 may allow the connection to the public wireless network by granting the request. If the address information of the requesting client device is included in device database 120, interface device 111 may disallow the connection to the public wireless network by denying the request or allowing the request to timeout. In certain implementations, the requesting client device may scan for other networks, such as interface device 111's private wireless network, according to its network connection priority (e.g., as indicated by an ordered list of networks or network types stored in the client device's memory).

In certain implementations, interface device 111 may authenticate and connect the requesting client device to the private wireless network after it has been identified as a device and denied connection to the public wireless network. For example, the client device may be configured to scan for nearby available wireless networks, and attempt to connect to them sequentially. If the client device attempts to connect to the private network, and is denied, it may then attempt the private network later in the list. To this end, interface device 111 may authenticate and connect wireless device 116 to the private wireless network after denying a request from wireless device 116 to access the public wireless network. In certain implementations, if interface device 111 determines that the client device is not authorized to access the private wireless network (e.g., by failing the authentication requirements of interface device 111's private wireless network based on, for example, an invalid username/password, an invalid pre-shared key, or an invalid MAC address), interface device 111 may allow the client device to connect to its public wireless network even though the client device may be identified as a device and may have previously been denied access to the public wireless network. If interface device 111 provides its public and private wireless networks on different channels or frequency bands, interface device 111 may, in some instances, allow the client device to connect to its public wireless network if there is excessive interference or high utilization on the private wireless network.

In some embodiments, one or more of the wireless networks provided by interface device 111 may be configurable. For example, the public wireless network, private wireless network, or both may be dynamically configurable by a user or local office 103 to indicate the channel to communicate on, the network identifier to broadcast, whether or not the network identifier should be publicly broadcast, or any other suitable information.

The wireless communications component of interface device 111 may wirelessly broadcast network identifiers, such as service set identifiers (SSIDs), for one or more of the wireless networks it provides or provides access to. For example, interface device 111's wireless communications component may broadcast a public wireless network identifier (e.g., an SSID) to all client devices within wireless broadcasting range of interface device 111. In another example, the wireless communications component of interface device 111 may not broadcast network identifiers for one or both of the public and private wireless networks.

Interface device 111 may authenticate client devices requesting access to one or more of its wireless networks. In certain implementations, client devices requesting access to the public wireless network, private wireless network, or both may be authenticated using a cryptographic technique. For example, interface device 111 may authenticate and encrypt communications using Wired Equivalent Privacy (WEP), Wi-Fi Protected Access (WPA), Wi-Fi Protected Access II (WPA2), Pre-Shared Key (PSK), Temporal Key Integrity Protocol (TKIP), IEEE 802.1X, Advanced Encryption Standard (AES), Counter Mode with Cipher Block Chaining Message Authentication Code Protocol (CCMP), or any other suitable cryptographic technique or combination of techniques. In certain implementations, the authentication may occur automatically without manual input from a user of the client device. For example, interface device 111 may authenticate a requesting client device using an authentication table or a MAC address filter. In certain implementations, the authentication may require user input. For example, the user of the client device may input a username and password that is compared against a secure data store of authorized usernames and respective passwords to determine whether the client device is authorized to access the network.

Interface device 111 may encrypt communications to and from a client device using any suitable technique. For example, data communicated over the public wireless network, private wireless network, or both may be encrypted using TKIP, AES, CCMP, or any other suitable cryptographic technique. In certain implementations, interface device 111 may encrypt data differently for different wireless networks. For example, interface device 111 may encrypt data transmissions on the private network using a higher (e.g., more secure) level of encryption than the level of encryption for data transmissions on the public network.

Interface device 111 may simultaneously or near-simultaneously communicate with public client devices on the public wireless network and devices on the private wireless network. In certain implementations, interface device 111 may compartmentalize data communications over the public network and the private network such that data communicated on the private network cannot be accessed by client devices on the public network. For example, interface device 111 may implement a firewall or other security techniques to differentiate the public client device's traffic and the device's traffic (e.g., using VLAN technology). This compartmentalization feature allows for increased security because devices on the private wireless network are protected from potentially malicious public client devices on the public wireless network.

Interface device 111, local office 103, or both may include additional computer logic to bridge data communication between the private wireless network and the public wireless network. For example, client device 115 may be a device on interface device 111's private network and may wish to communicate with client device 116, which may be a public client device on interface device 111's public network. In another example, interface device 111 may permit a device to access a public client device after the proper authentication processes have been successfully performed. In another example, the request may be transmitted to local office 103 for authentication and approval before a device on the private network is granted access to a public client device on the public network.

When multiple wireless networks are provided in an area, a user device may receive service set identifiers (SSIDs) for multiple wireless networks provided by multiple wireless routers. Dual-SSID wireless routers may help facilitate this, by offering wireless networks with different SSIDs. Wireless devices can connect to the different SSIDs for different purposes. There remains an ever-present need, however, to effectively manage these multiple SSIDs and their usage by wireless devices. This is particularly true in situations where the available resources for the different SSIDs (e.g., processing support at the router, available bandwidth on a backhaul connection, etc.) are limited, or allocated differently among the SSIDs.

When multiple wireless networks are available to a client device, interface device 111, local office 103, or both may identify the best wireless network for the client device's use. For example, interface device 111 may select a private wireless network over a public wireless network when a requesting client device is a premise device (e.g., located in example premise 102a). In another example, as a client device travels to a new location (e.g., from a restaurant to the user's home), the original wireless network (e.g., the restaurant's public wireless network) to which it was connected may no longer be detectable by the client device. The client device may search for a new wireless network and automatically request to connect once a compatible network is identified. In one example, the client device may connect to the interface device of a new compatible public wireless network if it is not identified by the interface device as a device. In certain implementations, the client device may provide active session data to the new interface device for session handoff. Alternatively, if the client device is a premise client device of the interface device which provides the new compatible public wireless network, the interface device may deny the connection request and allow the client device to connect to the interface device's private wireless network.

Interface device 111 may support seamless transition of the client device between different networks. For example, a client device on interface device 111's public wireless network may transition to its private wireless network. In another example, the transition may be from a private network at the user's premise 102a to a public network being broadcast by an interface device in a neighbor's premise 102b. In another example, the transition may be over different physical networks, such as WiMax, Femto, cellular networks, or any other suitable network. For example, the client device may transition from a public network broadcast over an HFC or optical fiber network to a different public network broadcast over a cellular network. In certain implementations, session data may be provided to the interface device of the new network connection for seamless transition.

Interface device 111, local office 103, or both may manage bandwidth allocation. For example, bandwidth may be allocated statically, dynamically, or both based on the demand of each client device. In another example, interface device 111 may manage quality of service (QoS) and allocate bandwidth so that predetermined services may be provided to the client device. For example, interface device 111 may determine if sufficient bandwidth remains for a new client device. The available bandwidth may be measured based on the number of connected client devices, the bandwidth requirements of applications, or any other suitable parameter. If sufficient bandwidth is available, the client device may be connected to the wireless network. If insufficient bandwidth remains, the client device may be disconnected and a notification (e.g., "try again later") may be transmitted to the disconnected client device. In another example, if the disconnected client device is a premise client device that has been disconnected from interface device 111's private wireless network, it may be permitted to connect to interface device 111's public wireless network even though it has been identified as a device.

Interface device 111 may negotiate bandwidth to ensure that the desired QoS and bandwidth are available to each wireless network. For example, interface device 111 may negotiate bandwidth to ensure that the desired QoS and bandwidth are available to the private wireless network due to the public wireless network and private wireless network sharing a common backhaul connection to the Internet. In another example, interface device 111 may negotiate bandwidth to prevent a single client device from hijacking the public wireless network by consuming all or most of the network's bandwidth. In certain implementations, the bandwidth consumption of a client device on the private wireless network may take precedence over the bandwidth consumption of any client device on the public wireless network. In certain implementations, local office 103 may provide rules, instructions, or both to interface device 111 for bandwidth allocation and QoS requirements. For example, these rules may guide the allocation of bandwidth at a granular level (e.g., a session level, a device level) and indicate that some applications may have higher priority than others (e.g., emergency services such as E911 may have top priority).

Interface device 111 may statically allocate bandwidth for client devices on the private network. The remaining bandwidth may be available for the public network. Each client device may be initially allocated a fixed amount of bandwidth and based on the particular device's requirement (i.e., application running on the device) and additional bandwidth may be dynamically allocated. For example, a minimum bandwidth may be allocated for each client device to provide basic applications and guarantee predetermined service levels and QoS. If numerous client devices connect to interface device 111 and it is not possible to allocate the minimum bandwidth for a client device (e.g., by reducing the communications data rate to 64 kbps for client devices that have exceeded a threshold limit), then the client device may be rejected permission to connect to interface device 111. In another example, when a client device on the private network is accessing interface device 111 concurrently with a number of client devices on the public network, then interface device 111 may dynamically allocate only the required amount of bandwidth to the private user and apply the remaining bandwidth to the public users. In that case, if the private user requires additional bandwidth, then interface device 111 may reduce the bandwidth allocated to the public wireless network and increase the bandwidth allocated to the private wireless network.

Figure 2:
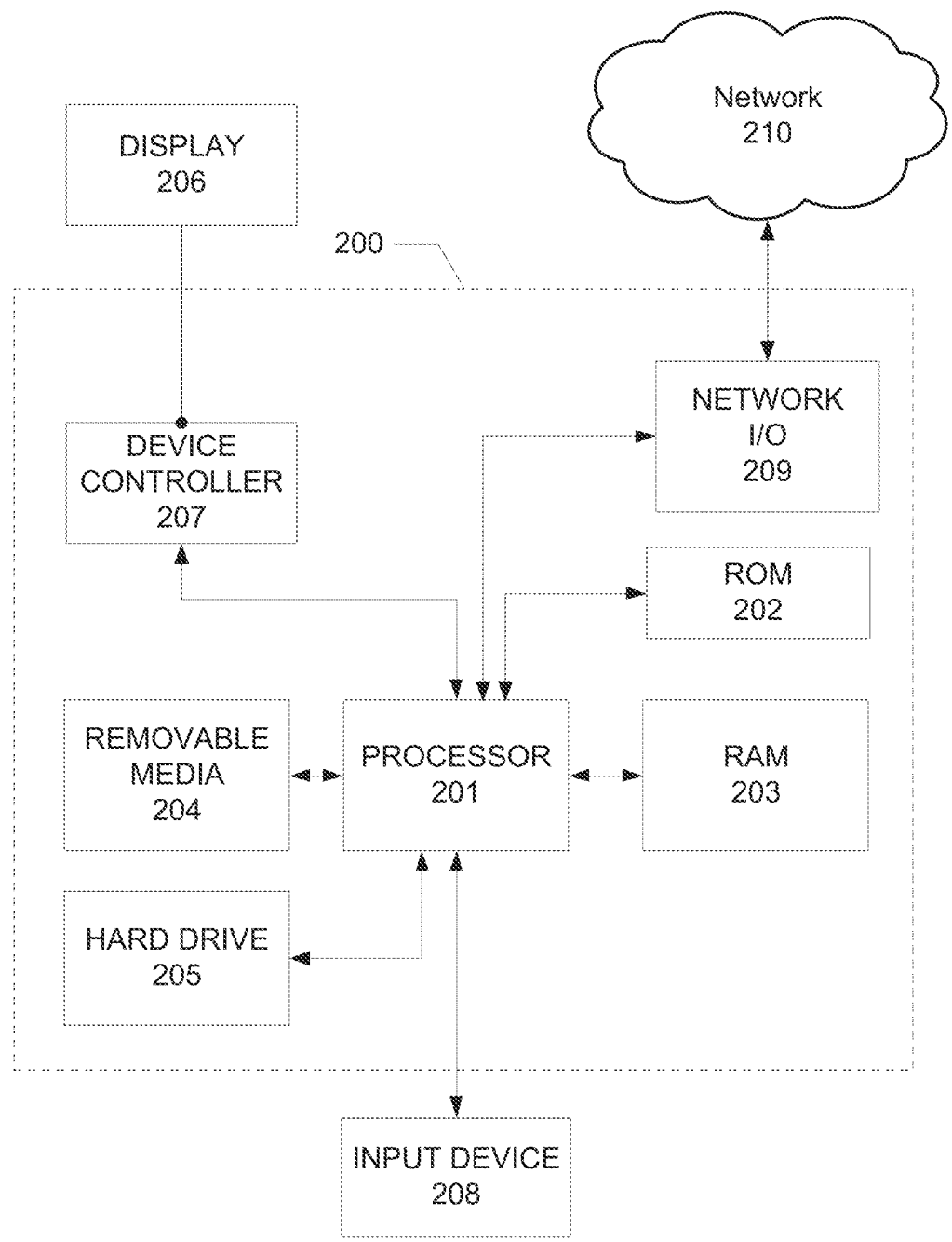
FIG. 2 illustrates an example computing device on which various elements described herein may be implemented.

FIG. 2 illustrates general hardware elements that can be used to implement any of the various computing devices described herein. Device 200 may include one or more processors 201, which may execute instructions of a computer program to perform any of the features described herein. The instructions may be stored in any type of computer-readable medium or memory to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in hard drive 205, which may be an internal or external hard drive.

In some embodiments, device 200 may include one or more output devices, such as a display 206 (e.g., an external monitor or television) and may include one or more output device controllers 207, such as a video processor. In some embodiments, device 200 may include one or more user input devices 208, such as a remote control, keyboard, mouse, touch screen, microphone, or any other suitable input device.

In some embodiments, device 200 may include one or more network interfaces, such as input/output (I/O) interface 209 (e.g., a network card), for communicating with external network 210. Interface 209 may be a wired interface, a wireless interface, or both. In certain implementations, interface 209 may include a modem (e.g., a cable modem), and network 210 may include communication links 101 shown in FIG. 1, one or more external networks 109, an in-home network, a provider's wireless, coaxial, fiber, or hybrid fiber/coaxial distribution system (e.g., a DOCSIS network), or any other desired network.

Figure 3:
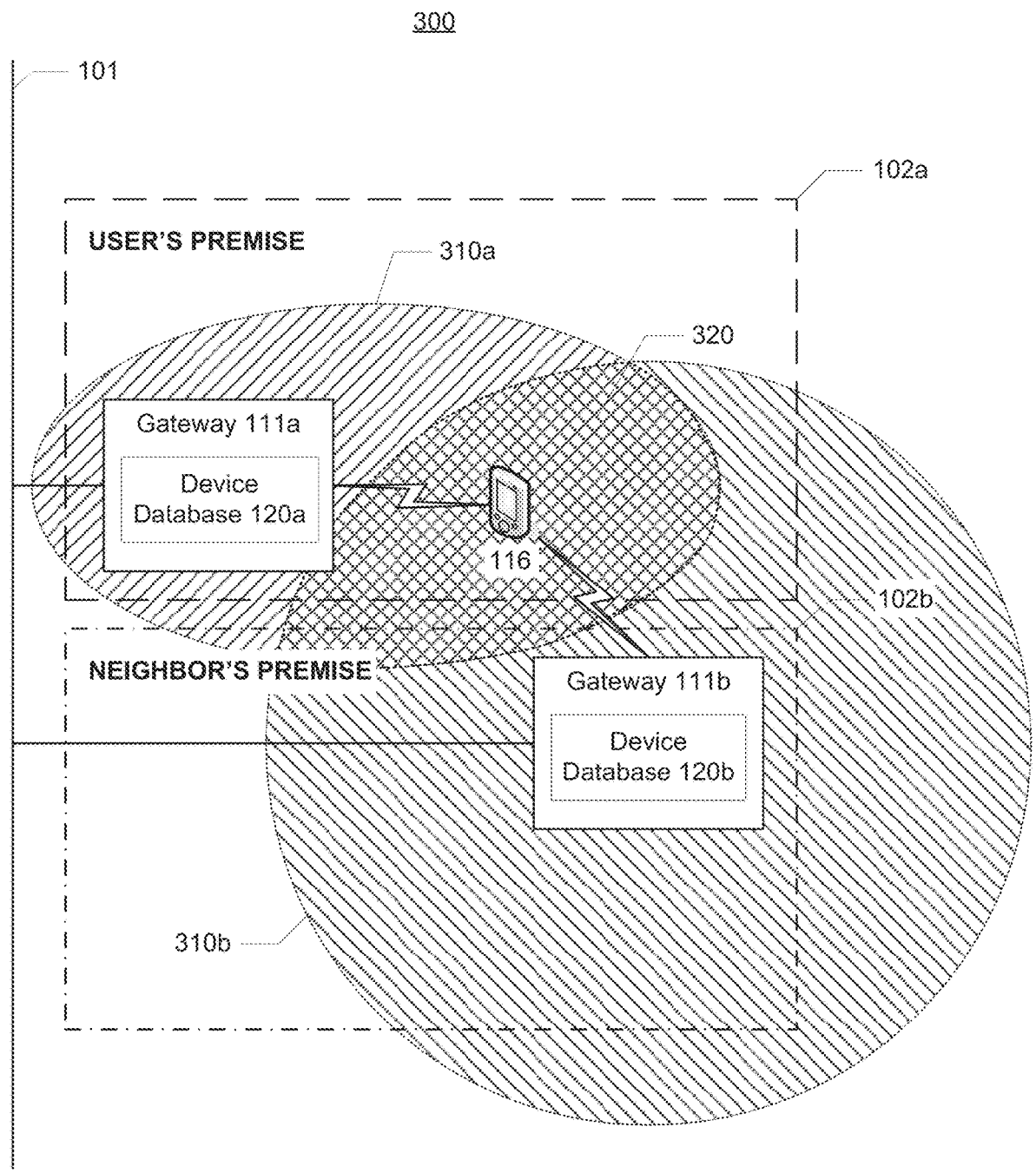
FIG. 3 illustrates an example wireless network environment.

FIG. 3 illustrates an example wireless network environment 300 in which interface devices provide overlapping wireless access points. Example environment 300 is only one example of a suitable wireless network environment and is not intended to suggest any limitation as to the scope of use or functionality of the disclosure. The illustrated network environment should not be interpreted as having any dependency or requirement relating to any one or combination of components in a wireless network environment.

Example wireless network environment 300 includes example premise 102*a* and example premise 102*b*, which may be neighboring apartments, airport terminals, areas within the same home, or any other suitable environment within wireless broadcasting range of multiple interface devices. Example premise 102*a* and example premise 102*b* may be communicatively coupled to communication links 101 through interface device 111*a* and interface device 111*b*, respectively. Interface device 111*a* may provide a public wireless network, a private wireless network, or both within a wireless broadcasting range indicated by wireless access region 310*a* (e.g., using a directional antenna). Interface device 111*a* may include a database of device registration information, such as device database 120*a*, for identifying the devices of example premise 102*a*. Interface device 111*b* may provide a public wireless network, a private wireless network, or both within a wireless broadcasting range indicated by wireless access region 310*b* (e.g., using an omnidirectional antenna). Interface device 111*b* may include a database of device registration information, such as device database 120*b*, for identifying the devices of example premise 102*b*.

In some embodiments, interface device 111*a*, interface device 111*b*, or both may include features described with reference to interface device 111 shown in FIG. 1. For example, interface device 111*a*, interface device 111*b*, or both may authenticate and encrypt communications with wireless device 116, support seamless transition of wireless device 116 between different networks, negotiate bandwidth allocation to ensure that the desired QoS and bandwidth are available to each wireless network, track the approximate location of wireless device 116 (e.g., for determining which interface device to connect to or retrieve information from), or perform any other suitable function.

In some embodiments, device database 120*a*, device database 120*b*, or both may include features described with reference to device database 120 shown in FIG. 1. Device database 120*a* may include, for example, address information for client devices with access to interface device 111*a*'s private wireless network, connection information, and any other suitable information. Device database 120*b* may include, for example, address information for client devices with access to interface device 111*b*'s private wireless network, connection information, and any other suitable information. In certain implementations, device database 120*a*, device database 120*b*, or both may be partially or wholly implemented in registration server 130 shown in FIG. 1.

In some embodiments, interface device 111*a* and interface device 111*b* may exchange information included in device database 120*a* and device database 120*b*, respectively, via a registration service or network controller. The network controller may determine which interface devices provide overlapping wireless coverage areas and instruct those interface devices to exchange information. For example, interface device 111a and interface device 111b may exchange device registration information through a direct wireless connection or an indirect connection through communication links 101. In another example, interface device 111a and interface device 111b may transmit device registration information to local office 103 (FIG. 1) through communication links 101, and receive compiled registration information for both interface devices (and possibly other interface devices) from local office 103.

In some embodiments, wireless access region 310a and wireless access region 310b may overlap as illustrated by wireless overlap region 320. As a result, wireless device 116 located in example premise 102a may be within wireless broadcasting range of both interface device 111a located in premise 102a and interface device 111b located in premise 102b. For example, wireless device 116 located in premise 102a may be within range of four wireless networks (e.g., two public networks and two private networks) collectively provided by interface device 111a and interface device 111b.

In some embodiments, interface device 111a may receive a request from wireless device 116 to connect to its public wireless network. For example, a user may enter example premise 102a with wireless device 116, which may automatically request to connect to interface device 111a's public wireless network because it was previously connected to a public wireless network in another location, such as a school library. When a request is received, interface device 111a may query device database 120a to determine if wireless device 116 is a premise device. For example, interface device 111a may determine that wireless device 116 is a premise device if its address information is stored in device database 120a. If the address information of wireless device 116 is not found in device database 120a, interface device 111a may allow the connection to its public wireless network by granting the request. If the address information of wireless device 116 is included in device database 120a, interface device 111a may disallow the connection to its public wireless network by denying the request or allowing the request to timeout. In some implementations, interface device 111a may authenticate and connect wireless device 116 to its private wireless network after it has identified wireless device 116 as a device.

In some embodiments, wireless device 116 may scan for other networks according to its network connection priority after it has been denied connection to interface device 111a's public wireless network. For example, wireless device 116 may identify and request to connect to interface device 111b's public wireless network based on an ordered list of networks or network types stored in wireless device 116's memory. Interface device 111b may receive the request and query device database 120b to determine if wireless device 116 is a premise device. If the address information of wireless device 116 is not found in device database 120b, interface device 111b may allow the connection to the public wireless network by granting the request. Alternatively, interface device 111b may query information included in device database 120a to determine whether wireless device 116 is a premise device of interface device 111a. If interface device 111b identifies wireless device 116 as a device of interface device 111a, it may disallow the connection to the public wireless network by denying the request or allowing the request to timeout. Wireless device 116 may then scan for other networks according to its connection priority after it has been denied connection to interface device 111b's public wireless network. As a result, wireless device 116 may be encouraged to connect to interface device 111a's private wireless network.

FIG. 4 illustrates example information 400 for devices having access to various wireless networks. In some embodiments, information 400 may be included in a database of device registration information, such as device database 120 shown in FIG. 1. For example, information 400 may be a data structure stored in a memory of the interface device 111 shown in FIG. 1. In certain implementations, information 400 may be stored remotely in registration server 130 shown in FIG. 1. In some embodiments, information 400 may be included in a user interface displayed on device 200 shown in FIG. 2 using, for example, display 206 shown in FIG. 2.

Information 400 may include registration information for a plurality of devices, each associated with a respective interface device identification field 402, network SSID field 404, device identification field 406, connection information field 408, and time period of inactivity field 410. Registration information for respective devices may be included in registration information rows 411-419, or in any other suitable field, grouping, data structure, or combination thereof.

Interface device identification field 402 may include, for example, address information (e.g., a unique identifier, a hardware address, a MAC address, an IP address, a user name, a device name) for interface devices or intermediate devices that respectively handle the interface devices' communications. Network SSID field 404 may include, for example, network identifier information for a wireless network provided by an interface device identified in field 402. Device identification field 406 may include, for example, address information (e.g., a unique identifier, a hardware address, a MAC address, an IP address, a user name, a device name) for devices with access to the wireless network corresponding to network SSID field 404, or for intermediate devices that respectively handle the devices' communications. Connection information field 408 may include, for example, time of connection information, such as the most recent date and time that a device identified in field 406 has connected to a network identified in field 404. In certain implementations, connection information field 408 may include connection duration, connection speed, signal quality, amount of data transmitted to a connected device, amount of data received from the connected device, or any other suitable information. Time period of inactivity field 410 may include, for example, the difference between a current date and time (e.g., as identified by interface device 111 shown in FIG. 1) and the date and time that the device identified in field 406 last connected to the network identified in field 404 (e.g., the date and time identified in field 408).

In some embodiments, information 400 may be dynamically updated to permit or block usage of particular devices on various networks. For example, registration information for devices may be added to, stored in, or removed from information 400 by interface device 111 shown in FIG. 1, local office 103 shown in FIG. 1, or both.

In certain implementations, the interface device may update information 400 when, for example, a device connects to the interface device's private wireless network. For example, interface device 111 shown in FIG. 1 may have a MAC address "00AA11BB22CC" and provide a private wireless network having an SSID "102a_home." When a device having a MAC address "01AB23CD45EF" connects to the private wireless network "102a_home," interface device 111 may add registration information row 411 to information 400.

In certain implementations, the interface device may maintain stored registration information in information 400 for a device having access to the interface device's private wireless network. For example, interface device 111 may provide a second private wireless network having an SSID "102a_john_private" and may store registration information row 412 in information 400 for a device having a MAC address "12AB34CD56EF" that may have previously connected to the second private wireless network "102a_john_private." In another example, information 400 may include a user-specified list of MAC addresses (e.g., MAC addresses input by a user using input device 208 shown in FIG. 2) for use in a MAC address filter implemented by the interface device.

In certain implementations, the interface device may remove registration information from information 400 after a predetermined time period of inactivity. The predetermined time period of inactivity may be stored, for example, in the interface device storing information 400 in response to input from a manufacturer of the interface device, a user or owner of the interface device, a service provider, or a service provider's local office using, for example, input device 208 shown in FIG. 2. For example, interface device 111 may remove registration information row 413 from information 400 for a device having a MAC address "23AB45CD67EF" that may have not connected to the private wireless network "102a_home" within a predetermined time period of inactivity of 30 days. In another example, interface device 111 may store information 400 as a list of MAC addresses and corresponding connection times for devices that have connected to one of its wireless networks over a predetermined period of time (e.g., in the last 30 days). Interface device 111 may purge information 400 at any suitable frequency, at which time devices identified in field 406 that have not connected to a respective wireless network identified in field 404 during the predetermined time period of inactivity (e.g., 30 days) are removed from the list. As a result, these devices are no longer identified as having access to the respective wireless network identified in field 404 and may be allowed to access to interface device 111's public wireless network. In certain implementations, interface device 111 may purge information 400 based on congestion, number of retries within a particular period of time, device type, or any other suitable criteria or operator policy.

In some embodiments, information 400 may include registration information for devices that have access to wireless networks provided by other interface devices which may share an overlapping wireless broadcasting area with the interface device that stores information 400. For example, a network controller may determine which interface devices provide overlapping wireless coverage areas and instruct those interface devices to exchange information. Devices having access to wireless networks provided by different wireless networks may be added to, stored in, or removed from information 400 by interface device 111 shown in FIG. 1, a different interface device, or local office 103 shown in FIG. 1.

In certain implementations, the interface device may update information 400 when, for example, a device connects to a wireless network provided by a different interface device. For example, interface device 111b shown in FIG. 3 may have a MAC address "OOBB11CC22DD" and provide a private wireless network having an SSID "102b_private." When a device having a MAC address "01BC23DE45FG" connects to the private wireless network "102b_private," interface device 111b may add, or may cause interface device 111a shown in FIG. 3 to add (e.g., by transmitting information to interface device 111a, by allowing interface device 111a to access interface device 111b's memory, etc.), registration information row 414 to information 400. In another example, interface device 111a may identify a device having access to a private wireless network provided by interface device 111b by adding the device's MAC address to information 400 in response to the device connecting to the private wireless network provided by interface device 111b.

In certain implementations, the interface device may maintain stored registration information in information 400 for a device having access to another interface device's private wireless network. For example, interface device 111a shown in FIG. 3 may store registration information row 415 in information 400 for a device having a MAC address "12BC34DE56FG" that may have access to the private wireless network "102b_private" provided by interface device 111b shown in FIG. 3 having a MAC address "OOBB11CC22DD." In another example, interface device 111a may store registration information row 417 in information 400 for a device having a MAC address "01CD23EF45GH" that may have access to a private wireless network having an SSID "Restaurant secure" provided by restaurant's interface device having a MAC address "00CC11DD22EE." In another example, interface device 111 shown in FIG. 1 may store registration information row 419 in information 400 for a device having a MAC address "01DE23FG45HI" that may have access to a campus wireless network having an SSID "University" provided by a university's interface device having a MAC address "00DD11EE22FF." In another example, information 400 may be stored in device database 120a shown in FIG. 3 and may include a user-specified list of MAC addresses for devices that have been identified as having access to interface device 111b's private wireless network. In some instances, when an interface device receives address information from a device that is a neighboring interface device, it may allow the device to connect to its public wireless network after a predetermined amount of retries (e.g., 3 retries) because the device may not be able to connect to the private wireless network of the neighboring interface device.

In certain implementations, the interface device may remove registration information from information 400 for a device having access to another interface device's wireless network after a predetermined time period of inactivity, which may be different for different wireless networks, different interface devices, or both. For example, interface device 111a shown in FIG. 3 may remove registration information row 416 from information 400 for a device having a MAC address "23BC45DE67FG" that may have not connected to the private wireless network having the SSID "102b_private" within a predetermined time period of inactivity of 60 days. In another example, interface device 111 may remove registration information row 418 from information 400 for a device having a MAC address "12CD23EF56GH" that may have not connected to the private wireless network having the SSID "Restaurant secure" within a predetermined time period of inactivity of 90 days.

Figure 5:
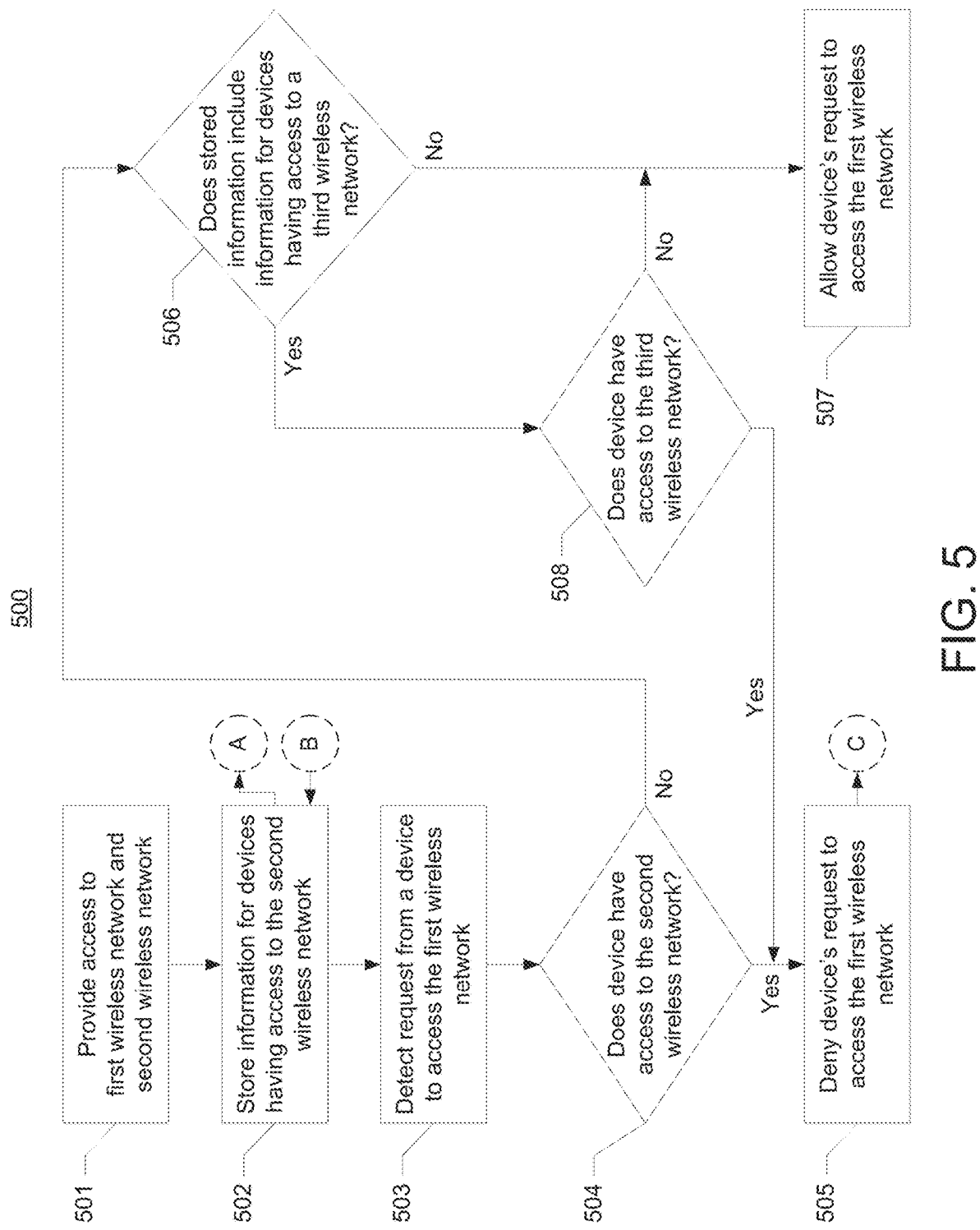
FIG. 5 illustrates an example process for processing a request to access a wireless network.

FIG. 5 illustrates an example process flow 500 for processing a request to access a wireless network provided by an interface device.

In step 501, the interface device provides or provides access to a first wireless network and a second wireless network. In certain implementations, interface device 111 shown in FIG. 1 may provide a public wireless network and a private network within the same wireless broadcasting range. For example, interface device 111 may provide a public wireless network on a first frequency band (e.g., 2.4 GHz) and a private wireless network on a second frequency band (e.g., 5 GHz). In another example, interface device 111 may provide a first private wireless network maintained by local office 103 shown in FIG. 1 on a first frequency band and a second private wireless network maintained by a user in example premise 102a shown in FIG. 1 on a second frequency band different from the first frequency band. In another example, interface device 111 may provide any suitable number and combination of wired networks, wireless networks, or both using any suitable communications technique. In another example, interface device 111 may provide the public and private wireless networks on the same frequency band or channel. In certain implementations, the first and second wireless networks may have different service level agreements (SLAs), which may result in different byte limits, allocated bandwidths, authentication/encryption processes, or any other suitable processes or parameters. In certain implementations, upon first startup, the interface device may implement a default configuration, such as a default out-of-the-box configuration, for its private wireless network, which may be modified by a user, central office 103, or both.

In step 502, the interface device stores (e.g., for future reference) information for devices having access to the second wireless network. The stored information may include registration information for a plurality of devices having access to the second wireless network. Registration information may include, for example, address information for devices (or intermediate devices that respectively handle the devices' communications) with access to the second wireless network, address information for interface devices, connection information, and any other suitable information. Address information may include, for example, a unique identifier, a hardware address, a MAC address, an IP address, a user name, a device name, or any other suitable information. Connection information may include, for example, time of connection, duration, speed, signal quality, amount of data transmitted to a device, amount of data received from the device, network identifier of the connection (e.g., for multiple wireless networks), and any other suitable information. For example, the interface device may store information described with reference to example information 400 shown in FIG. 4. In another example, interface device 111 shown in FIG. 1 may include, or be communicatively coupled to, a database of device registration information, such as device database 120. In certain implementations, the stored information may include information determined from historical registration information, such as average (e.g., arithmetic or geometric mean, median, mode) values of previous connection times, durations, signal strengths, and speeds for various devices. In certain implementations, the stored information may include registration information for devices having access to a third wireless network, multiple wireless networks, or any other suitable network or combination of networks provided by any suitable number of interface devices (e.g., interface devices that share an overlapping wireless broadcasting area with interface device 111). In some embodiments, process 500 may proceed to optional step A after denying the device's request to access the first wireless network. Optional step A will be discussed in further detail with reference to FIG. 7.

In step 503, the interface device detects a request from a device to access the first wireless network. For example, interface device 111 shown in FIG. 1 may detect a request from wireless device 116 to access interface device 111's first wireless network. The request may include address information (e.g., MAC address, IP address) to identify the requesting device. In certain implementations, the interface device may detect a request from an intermediate device that handles the device's communications.

In step 504, the interface device determines whether or not the device requesting access to the first wireless network has access to the second wireless network. For example, the interface device (e.g., interface device 111 shown in FIG. 1) may search a database of device registration information (e.g., device database 120 shown in FIG. 1) to determine whether or not it contains the address information extracted from the detected request from the device (e.g., wireless device 116), or an association between the extracted address information and the second wireless network. If it does, the interface device may determine that the requesting device has access to the second wireless network. In another example, interface device 111 may communicate with local office 103 shown in FIG. 1, which may search registration server 130 to determine if the address information corresponds to a device having access to the second wireless network of interface device 111. If the interface device determines that the device has access to the second wireless network, the process proceeds to step 505. If the interface device determines that the device does not have access to the second wireless network, the process proceeds to step 506.

In step 505, the interface device denies the device's request to access the first wireless network in response to determining that the requesting device has access to the second wireless network. For example, in response to interface device 111 shown in FIG. 1 determining that address information associated with wireless device 116 is contained in device database 120, interface device 111 may not permit wireless device 116 to connect to its public wireless network. In some embodiments, process 500 may proceed to optional step C after denying the device's request to access the first wireless network. Optional step C will be discussed in further detail with reference to FIG. 7.

In step 506, the interface device determines whether or not the stored information includes information for devices having access to a third wireless network. The third wireless network or access thereto may be provided by the interface device or by a different interface device. For example, interface device 111 shown in FIG. 1 may search device database 120 to determine whether or not it includes address information for devices having access to a third wireless network different from the first or second wireless networks. In another example, interface device 111a shown in FIG. 3 may search device database 120a to determine whether or not it includes address information for devices having access to a wireless network provided by interface device 111b. If the interface device determines that the stored information does not include information for devices having access to a third wireless network, the process proceeds to step 507. If the interface device determines that the stored information includes information for devices having access to a third wireless network, the process proceeds to step 508.

In step 507, the interface device allows the device's request to access the first wireless network. For example, in response to interface device 111 shown in FIG. 1 determining that address information associated with wireless device 116 is not contained in device database 120, interface device 111 may allow wireless device 116 to connect to the public wireless network. In certain implementations, the interface device may also authenticate and encrypt communications with the device connected to its first wireless network.

In step 508, the interface device determines whether or not the device requesting access to the first wireless network has access to the third wireless network. For example, the interface device (e.g., interface device 111 shown in FIG. 1) may search a database of device registration information (e.g., device database 120 shown in FIG. 1) to determine whether or not it contains an association between the third wireless network and the address information extracted from the detected request from the device (e.g., wireless device 116). If it does, the interface device may determine that the requesting device has access to the third wireless network. In another example, interface device 111 may communicate with local office 103 shown in FIG. 1, which may search registration server 130 to determine if the address information corresponds to a device having access to a third wireless network of interface device 111 or a wireless network provided by a different interface device within wireless broadcasting range of the device or interface device 111. If the interface device determines that the device has access to the third wireless network, the process proceeds to step 505. If the interface device determines that the device does not have access to the third wireless network, the process proceeds to step 507.

Figure 6:
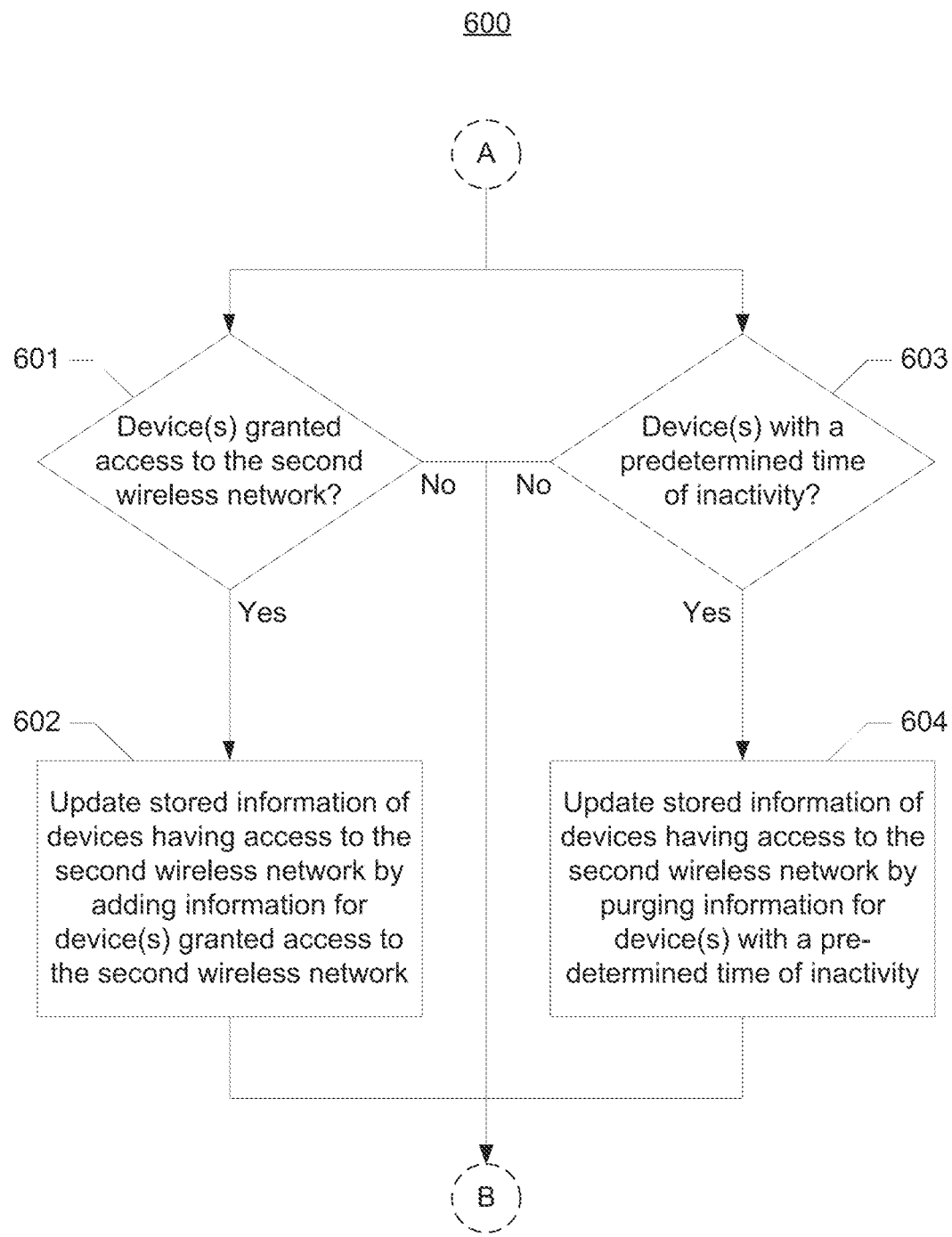
FIG. 6 illustrates an example process for updating information related to devices having access to a wireless network.

FIG. 6 illustrates an example process flow 600 for updating stored information for devices having access to a wireless network provided by an interface device.

In step 601, the interface device may determine whether one or more devices have been granted access to the second wireless network. For example, interface device 111 shown in FIG. 1 may determine that wireless device 116 has been granted access to the second wireless network in response to detecting a request from wireless device 116 to access interface device 111's second wireless network, extracting address information (e.g., MAC address, IP address) from the request to identify the requesting device, determining that wireless device 116 is authorized to access the second wireless network, and connecting wireless device 116 to the second wireless network. In another example, interface device 111 may determine that multiple devices have been granted access to the second wireless network in response to a user entering the devices' respective MAC addresses into a MAC address filter stored in interface device 111's memory. If the interface device determines that one or more devices have been granted access to the second wireless network, the process proceeds to step 602. If the interface device determines that no devices have been granted access to the second wireless network, the process proceeds to optional step B and returns to process 500 shown in FIG. 5.

In step 602, the interface device updates the stored information of devices having access to the second wireless network by adding information for the one or more devices that have been granted access to the second wireless network. In certain implementations, the interface device may update a database of device registration information with the registration information of the one or more devices connected to its second wireless network. For example, interface device 111 shown in FIG. 1 may add registration information row 411 to information 400 when a device connects to the second wireless network. In certain implementations, device database 120 shown in FIG. 1, registration database 130, or both may be updated to include registration information for devices that have connected to interface device 111's second wireless network. In one example, interface device 111 may add wireless device 116's MAC address and time of connection to device database 120 once it has connected to the second wireless network. As a result, device database 120 may be updated to indicate that wireless device 116 has access to the second wireless network. When wireless device 116 requests to connect to interface device 111's first wireless network, for example, interface device 111 may determine that wireless device 116 has access to interface device 111's second wireless network based on the updated information stored in device database 120 and deny the request.

In step 603, the interface device may determine whether one or more devices are associated with a predetermined time period of inactivity. For example, the interface device determine that a device is associated with a predetermined time period of inactivity if the device has not connected to the second wireless network during the predetermined time period of (e.g., 60 days). In certain implementations, the predetermined time period of inactivity may vary for different devices, wireless networks, or both. For example, a predetermined time period of inactivity for devices that have not connected to a second wireless network provided by interface device 111a shown in FIG. 3 may correspond to 30 days. In another example, a predetermined time period of inactivity for devices that have not connected to a wireless network provided by interface device 111b shown in FIG. 3 may correspond to 90 days. If the interface device determines that one or more devices are associated with a predetermined time period of inactivity, the process proceeds to step 604. If the interface device determines that no devices are associated with a predetermined time period of inactivity, the process proceeds to optional step B and returns to process 500 shown in FIG. 5.

In step 604, the interface device updates the stored information of devices having access to the second wireless network by purging information for the one or more devices that are associated with a predetermined time period of inactivity. In certain implementations, the interface device may purge the information at any suitable frequency (e.g., every 90 days), at which time devices that have not connected to the second wireless network during the predetermined period of time are removed from the list. As a result, these devices are no longer identified as having access to the second wireless network. In certain implementations, the interface device may update a database of device registration information by deleting the registration information of the one or more devices that are associated with the predetermined time period of inactivity. For example, interface device 111 shown in FIG. 1 may remove registration information row 413 from information 400 when a device has not connected to the second wireless network in a predetermined time period of inactivity of 30 days. In certain implementations, device database 120 shown in FIG. 1, registration database 130, or both may be updated to not include registration information for devices that have not connected to interface device 111's second wireless network, or any other suitable network, during the predetermined time period of inactivity. In one example, interface device 111 may remove wireless device 116's MAC address and time of connection from device database 120 once its last connection to the second wireless network is equal to or greater than the predetermined time period of inactivity. As a result, device database 120 may be updated to no longer indicate that wireless device 116 has access to the second wireless network. When wireless device 116 requests to connect to interface device 111's first wireless network, for example, interface device 111 may determine that wireless device 116 does not have access to interface device 111's second wireless network based on the updated information stored in device database 120 and allow the request.

Figure 7:
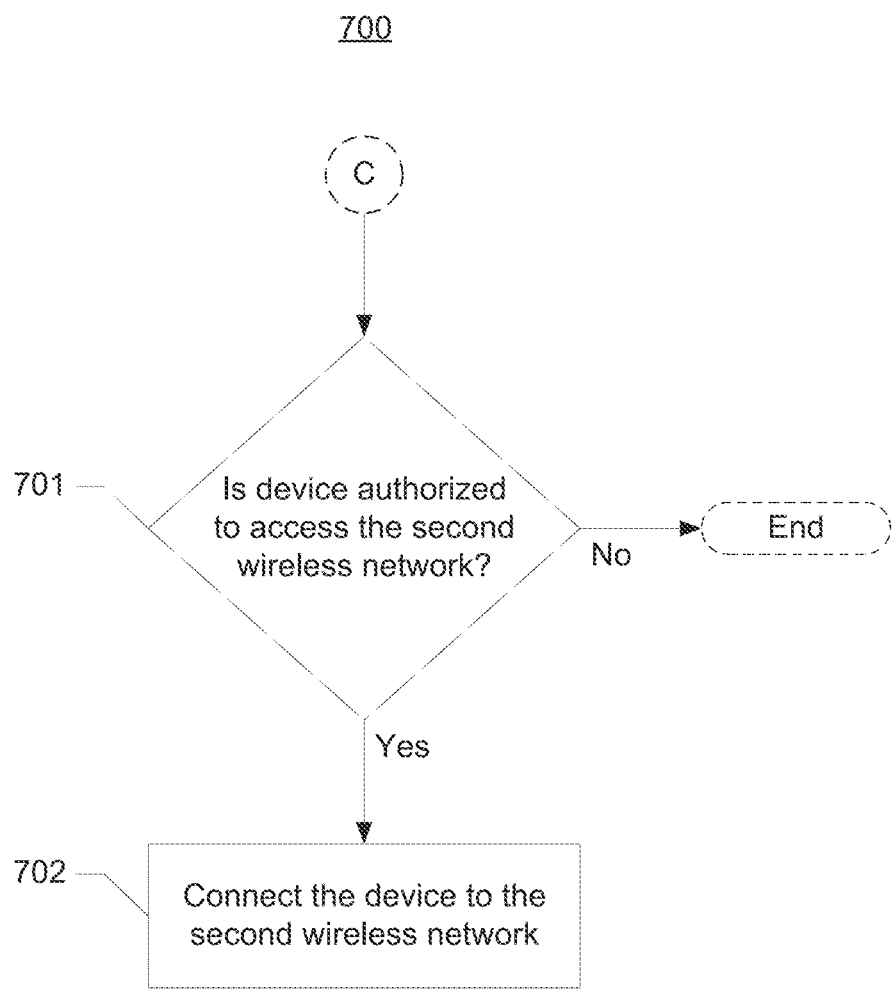
FIG. 7 illustrates an example process for processing a request to access a wireless network.

FIG. 7 illustrates an example process flow 700 for processing a request to access a wireless network provided by an interface device.

In step 701, the interface device determines whether or not the device denied from accessing the first wireless network is authorized to access the second wireless network. In certain implementations, interface device 111 shown in FIG. 1 may authenticate wireless device 116 in accordance with its authentication requirements (e.g., username/password, pre-shared key, device filtering). For example, interface device 111 may authenticate a requesting device using an authentication table or a MAC address filter. In another example, authentication may be partially or wholly performed by local office 103. In certain implementations, the authentication may occur automatically without manual input from a user of the device. For example, interface device 111 may authenticate and connect wireless device 116 to its second wireless network after it has denied wireless device 116 access to its first wireless network. In certain implementations, the authentication may require input from the user of the device. For example, the user may input a username and password that is compared against a secure data store of authorized usernames and respective passwords to ensure that the device is authorized to access the second wireless network. If the interface device determines that the device is authorized to access the second wireless network, the process proceeds to step 702. If the interface device determines that the device is not authorized to access the second wireless network, the process ends.

In step 702, the interface device connects the device to the second wireless network in response to determining that the device is authorized to access the second wireless network. For example, in response to interface device 111 shown in FIG. 1 successfully authenticating wireless device 116 to its second wireless network, interface device 111 may allow wireless device 116 to connect to the second wireless network.

With the features described above, various advantages may be achieved. An advantage of the present technique is that the interface device may provide a private wireless network to a device with a reasonable expectation of security while providing a public wireless network to other devices (e.g., roaming public users, third-party subscribers) without compromising the security of the private network. Another advantage of the present technique is that negative user experience is avoided in some instances as a result of guiding the connection of a user's devices to a private wireless network in the user's home without directly controlling the devices. As a result, the user's devices can connect to a private wireless network in the user's home instead of a public wireless network that may also be available in the user's home. Another advantage of the present technique is that user communications to local office 103 (e.g., phone calls, live chat, or emails to a customer service organization associated with local office 103) may be reduced because the user's devices are guided to the proper network. Accordingly, user churn (e.g., the loss of subscribers) may be reduced because the user's wireless computing experience is enhanced.

The various features described herein are merely non-limiting examples and may be rearranged, combined, subdivided, omitted, and/or altered in any desired manner. For example, features of the interface device may be subdivided among multiple processors and computing devices. The scope of this patent should be defined only by the claims that follow.

What is claimed is:

1. An apparatus comprising:
one or more processors; and
memory storing instructions that, when executed by the one or more processors, configure the apparatus to:
   receive, from a first computing device associated with a first wireless network, first address information;
   receive, from a second computing device associated with a second wireless network, second address information;
   determine, based on the first address information and the second address information, that the first computing device and the second computing device provide overlapping wireless coverage areas;
   send, based on determining that the first computing device and the second computing device provide overlapping wireless coverage areas, instructions to the first computing device, wherein the sent instructions configure the first computing device to send the first address information to the second computing device;
   receive, from a user device, a request to connect to the second wireless network;
   determine, based on the first address information, that the user device has access to the first wireless network; and
   based on determining that the user device has access to the first wireless network, cause denial of the request.

2. The apparatus of claim 1, wherein the stored instructions, when executed by the one or more processors, configure the apparatus to determine that the first computing device and the second computing device provide overlapping wireless coverage areas by determining that the first address information and the second address information comprise same address information of one of more user devices.

3. The apparatus of claim 1, wherein the stored instructions, when executed by the one or more processors, configure the apparatus to:
based on determining that the first computing device and the second computing device provide overlapping wireless coverage areas,
   cause the first computing device to send the first address information to a third computing device; and
   cause the second computing device to send the second address information to the third computing device.

4. The apparatus of claim 1, wherein the stored instructions, when executed by the one or more processors, configure the apparatus to:
based on a determination that the user device has failed to connect to the first wireless network, allow the user device to connect to the second wireless network.

5. The apparatus of claim 1, wherein the first address information comprises a list of media access control (MAC) addresses of a plurality of user devices that previously connected to the first wireless network.

6. The apparatus of claim 1, wherein the first address information comprises device registration information associated with a plurality of user devices.

7. The apparatus of claim 1, wherein the first computing device comprises a first wireless access point, and the second computing device comprises a second wireless access point.

8. A non-transitory computer-readable medium storing instructions that, when executed, cause:
receiving, from a first computing device associated with a first wireless network, first address information;
receiving, from a second computing device associated with a second wireless network, second address information;
determining, based on the first address information and the second address information, that the first computing device and the second computing device provide overlapping wireless coverage areas;
sending, based on the determining, instructions to the first computing device, wherein the sent instructions cause the first computing device to send the first address information to the second computing device;
receiving, from a user device, a request to connect to the second wireless network;
determining, based on the first address information, that the user device has access to the first wireless network; and
based on the determining that the user device has access to the first wireless network, causing denial of the request.

9. The non-transitory computer-readable medium of claim 8, wherein the stored instructions, when executed, cause the determining that the first computing device and the second computing device provide overlapping wireless coverage areas by causing determining that the first address information and the second address information comprise same address information of one of more user devices.

10. The non-transitory computer-readable medium of claim 8, wherein the stored instructions, when executed, cause:
based on the determining that the first computing device and the second computing device provide overlapping wireless coverage areas,
causing the first computing device to send the first address information to a third computing device; and
causing the second computing device to send the second address information to the third computing device.

11. The non-transitory computer-readable medium of claim 8, wherein the stored instructions, when executed, cause:
based on a determination that the user device has failed to connect to the first wireless network, allowing the user device to connect to the second wireless network.

12. The non-transitory computer-readable medium of claim 8, wherein the first address information comprises a list of media access control (MAC) addresses of a plurality of user devices that previously connected to the first wireless network.

13. The non-transitory computer-readable medium of claim 8, wherein the first address information comprises device registration information associated with a plurality of user devices.

14. The non-transitory computer-readable medium of claim 8, wherein the first computing device comprises a first wireless access point, and the second computing device comprises a second wireless access point.

15. A system comprising:
a network device;
a first computing device associated with a first wireless network; and
a second computing device associated with a second wireless network, wherein the network device comprises:
one or more processors; and
memory storing instructions that, when executed by the one or more processors, configure the network device to:
receive, from the first computing device, first address information;
receive, from the second computing device, second address information;
determine, based on the first address information and the second address information, that the first computing device and the second computing device provide overlapping wireless coverage areas;
send, based on determining that the first computing device and the second computing device provide overlapping wireless coverage areas, instructions to the first computing device, wherein the sent instructions cause the first computing device to send the first address information to the second computing device;
receive, from a user device, a request to connect to the second wireless network;
determine, based on the first address information, that the user device has access to the first wireless network; and
based on determining that the user device has access to the first wireless network, cause denial of the request,
wherein the first computing device is configured to send the first address information to the network device, and
wherein the second computing device is configured to send the second address information to the network device.

16. The system of claim 15, wherein the stored instructions, when executed by the one or more processors, configure the network device to determine that the first computing device and the second computing device provide overlapping wireless coverage areas by determining that the first address information and the second address information comprise same address information of one of more user devices.

17. The system of claim 15, wherein the stored instructions, when executed by the one or more processors, configure the network device to:
based on determining that the first computing device and the second computing device provide overlapping wireless coverage areas,
cause the first computing device to send the first address information to a third computing device; and
cause the second computing device to send the second address information to the third computing device.

18. The system of claim 15, wherein the stored instructions, when executed by the one or more processors, configure the network device to:
based on a determination that the user device has failed to connect to the first wireless network, allow the user device to connect to the second wireless network.

19. The system of claim 15, wherein the first address information comprises a list of media access control (MAC) addresses of a plurality of user devices that previously connected to the first wireless network.

20. The system of claim 15, wherein the first address information comprises device registration information associated with a plurality of user devices.

21. The system of claim 15, wherein the first computing device comprises a first wireless access point, and the second computing device comprises a second wireless access point.

22. An apparatus comprising:
one or more processors; and
memory storing instructions that, when executed by the one or more processors, configure the apparatus to:
receive, from a first computing device associated with a first wireless network, first address information;
receive, from a second computing device associated with a second wireless network, second address information;
determine, based on the first address information and the second address information, that the first computing device and the second computing device provide overlapping wireless coverage areas; and
send, based on determining that the first computing device and the second computing device provide overlapping wireless coverage areas, instructions to the first computing device, wherein the sent instructions cause the first computing device to send the first address information to the second computing device, and wherein the sent instructions cause the second computing device to deny, based on the first address information, a request to connect to the second wireless network.

23. The apparatus of claim 22, wherein the stored instructions, when executed by the one or more processors, configure the apparatus to determine that the first computing device and the second computing device provide overlapping wireless coverage areas by determining that the first address information and the second address information comprise same address information of one of more user devices.

24. The apparatus of claim 22, wherein the stored instructions, when executed by the one or more processors, configure the apparatus to:
cause, based on determining that the first computing device and the second computing device provide overlapping wireless coverage areas, the first computing device and the second computing device to exchange address information.

25. The apparatus of claim 22, wherein the stored instructions, when executed by the one or more processors, configure the apparatus to:
receive, from a user device, the request to connect to the second wireless network;
determine, based on the first address information, that the user device has access to the first wireless network; and
based on determining that the user device has access to the first wireless network, cause denial of the request.

26. The apparatus of claim 22, wherein the first address information comprises a list of media access control (MAC) addresses of a plurality of user devices that previously connected to the first wireless network.

27. The apparatus of claim 22, wherein the first address information comprises device registration information associated with a plurality of user devices.

28. The apparatus of claim 22, wherein the first computing device comprises a first wireless access point, and the second computing device comprises a second wireless access point.

29. A non-transitory computer-readable medium storing instructions that, when executed, cause:
receiving, from a first computing device associated with a first wireless network, first address information;
receiving, from a second computing device associated with a second wireless network, second address information;
determining, based on the first address information and the second address information, that the first computing device and the second computing device provide overlapping wireless coverage areas; and
sending, based on the determining, instructions to the first computing device, wherein the sent instructions cause the first computing device to send the first address information to the second computing device, and wherein the sent instructions cause the second computing device to deny, based on the first address information, a request to connect to the second wireless network.

30. The non-transitory computer-readable medium of claim 29, wherein the stored instructions, when executed, cause the determining by causing determining that the first address information and the second address information comprise same address information of one of more user devices.

31. The non-transitory computer-readable medium of claim 29, wherein the stored instructions, when executed, cause:
causing, based on the determining, the first computing device and the second computing device to exchange address information.

32. The non-transitory computer-readable medium of claim 29, wherein the stored instructions, when executed, cause:
receiving, from a user device, the request to connect to the second wireless network;
determining, based on the first address information, that the user device has access to the first wireless network; and
based on the determining that the user device has access to the first wireless network, causing denial of the request.

33. The non-transitory computer-readable medium of claim 29, wherein the first address information comprises a list of media access control (MAC) addresses of a plurality of user devices that previously connected to the first wireless network.

34. The non-transitory computer-readable medium of claim 29, wherein the first address information comprises device registration information associated with a plurality of user devices.

35. The non-transitory computer-readable medium of claim 29, wherein the first computing device comprises a first wireless access point, and the second computing device comprises a second wireless access point.

36. A system comprising:
a network device;
a first computing device associated with a first wireless network; and
a second computing device associated with a second wireless network, wherein the network device comprises:
one or more processors; and
memory storing instructions that, when executed by the one or more processors, configure the network device to:
receive, from the first computing device, first address information;
receive, from the second computing device, second address information;

determine, based on the first address information and the second address information, that the first computing device and the second computing device provide overlapping wireless coverage areas; and send, based on determining that the first computing device and the second computing device provide overlapping wireless coverage areas, instructions to the first computing device, wherein the sent instructions cause the first computing device to send the first address information to the second computing device, and wherein the sent instructions cause the second computing device to deny, based on the first address information, a request to connect to the second wireless network, wherein the first computing device is configured to send the first address information to the network device, and wherein the second computing device is configured to send the second address information to the network device.

37. The system of claim 36, wherein the stored instructions, when executed by the one or more processors, configure the network device to determine that the first computing device and the second computing device provide overlapping wireless coverage areas by determining that the first address information and the second address information comprise same address information of one of more user devices.

38. The system of claim 36, wherein the stored instructions, when executed by the one or more processors, configure the network device to:

cause, based on determining that the first computing device and the second computing device provide overlapping wireless coverage areas, the first computing device and the second computing device to exchange address information.

39. The system of claim 36, wherein the stored instructions, when executed by the one or more processors, configure the network device to:

receive, from a user device, the request to connect to the second wireless network;

determine, based on the first address information, that the user device has access to the first wireless network; and based on determining that the user device has access to the first wireless network, cause denial of the request.

40. The system of claim 36, wherein the first address information comprises a list of media access control (MAC) addresses of a plurality of user devices that previously connected to the first wireless network.

41. The system of claim 36, wherein the first address information comprises device registration information associated with a plurality of user devices.

42. The system of claim 36, wherein the first computing device comprises a first wireless access point, and the second computing device comprises a second wireless access point.

* * * * *